United States Patent [19]
Pistilli

[11] 3,784,068

[45] Jan. 8, 1974

[54] VIBRATION DAMPENER SUPPORT FOR LENTICULAR DEVICES

[76] Inventor: Henry L. Pistilli, 3 Bedford Rd., Kendael Park, N.J. 08824

[22] Filed: Nov. 16, 1967

[21] Appl. No.: 683,556

[52] U.S. Cl. ............................................. 224/5 V
[51] Int. Cl. ............................................. A45f 5/00
[58] Field of Search .................... 224/5, 5.3, 5.22, 224/25, 5.6; 95/86; 350/72, 248

[56] References Cited
UNITED STATES PATENTS

| | | | |
|---|---|---|---|
| 612,298 | 10/1898 | Zuberbier | 224/5.3 X |
| 817,207 | 4/1906 | Wheeler | 224/5.22 X |
| 1,018,771 | 2/1912 | Neuburger | 224/5.22 X |
| 1,720,982 | 7/1929 | Van Brunt | 224/5.6 X |
| 2,771,826 | 11/1956 | Shapiro | 224/5.22 X |
| 3,191,826 | 6/1965 | Adams | 224/5 |

Primary Examiner—Gerald M. Forlenza
Assistant Examiner—Robert Saifer
Attorney—Synnestvedt & Lechner

[57] ABSTRACT

A preferred embodiment of this vibration dampener includes, a stiff upstanding rod of light weight supports a lenticular device such as a movie camera or a field glass or glasses. A ball and socket connection supports this rod from a wearer's belt and a flexible band extends from adjacent a mid-portion of said rod over a shoulder of the wearer, across the back and forward under an arm of the wearer on an opposite side of the wearer from the aforementioned shoulder, and also secured to said rod adjacent a midportion thereof. The over-shoulder portion of said band thus forms a much smaller angle to the rod than does the under-arm portion when said device is at the level of the wearer's eyes.

6 Claims, 3 Drawing Figures

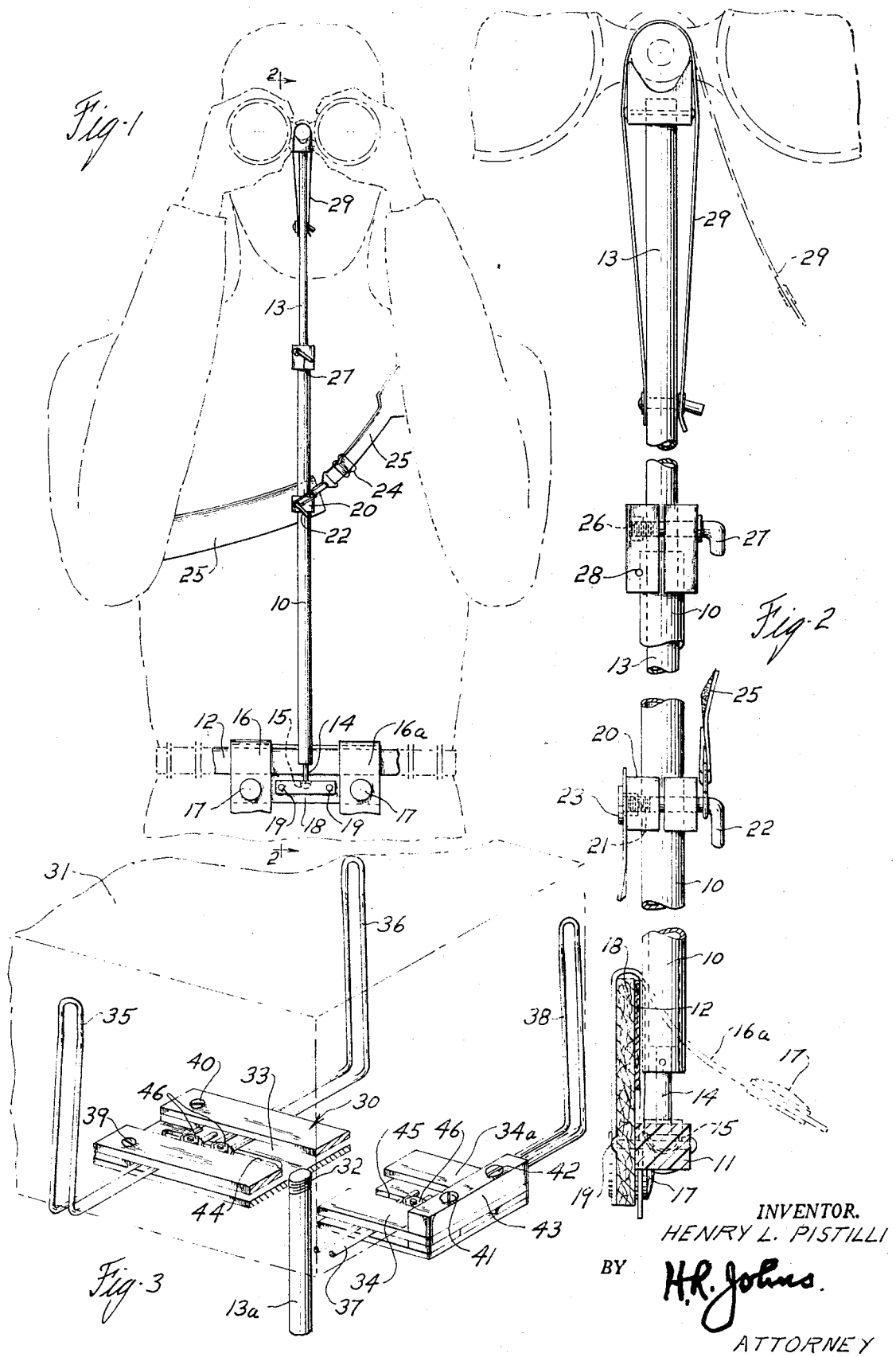

VIBRATION DAMPENER SUPPORT FOR LENTICULAR DEVICES

CROSS REFERENCES TO RELATED APPLICATIONS

There are none so far as is known.

BACKGROUND OF THE INVENTION a. The field of invention has been aptly stated in the above abstract.

b. During the many years a camera has been used, no satisfactory vibration dampening support has been provided although many suggestions have been made but not widely adopted. In the November 1966 Popular Photography on page 100 is the following statement:

"Isn't it ironic! Photographers are always searching, comparing, discussing, shopping for the 'best' lens. They back their hopeful decision with cash and then they nullify all this time, effort, and expenditure by failing to hold their camera steady. Regardless of the quality of your camera's lens, results can be no sharper than the steadiness of your grip permits. Of course, one solution would be not to hold the camera at all, but to mount it tightly on a substantial tripod. Unfortunately such a tripod may also act as an anchor restraining your photographic freedom. Moreover, under some circumstances a tripod may pass on vibrations, as in a car or airplane, or on a motorboat. Under such conditions it is better to let the body act as a shock-absorber."

BRIEF SUMMARY OF THE INVENTION

An object of this invention is to provide a simple and convenient support for a lenticular device such as a camera or binoculars, which is more desireable than a tripod, and which may allow the body to dampen some vibrations from outside the body but is also capable of dampening vibrations generated within the body such as those due to breathing. Instead of striving to dampen all portions of such vibrations due to breathing, it has been found good results are obtainable by cushioning the downward portion of the vertical component and the outward portion of the lateral or horizontal component due to breathing. Fatigue in the user has been noticeably reduced with both the photographer and the user of field glasses without resort to a tripod.

BRIEF DESCRIPTION OF DRAWINGS

FIG. 1 is a front elevation of a preferred embodiment of this invention in position on a wearer whose upper body is shown in a broken line outline with binoculars shown as the lenticular device being used.

FIG. 2 is a view of the rod of FIG. 1 from the left except that the upper portion shows a front instead of a side view.

FIG. 3 shows a moving picture camera mounted on the uppermost portion of the upstanding rod.

DETAILED DESCRIPTION OF INVENTION

A generally stiff telescopically extensible rod 10 is preferably supported by a socket member 11 from an ordinary belt 12 in this preferred embodiment. This rod 10 is of an aluminum alloy for lightness in weight and wear resistance. An upper portion 13 is shown in FIGS. 1 and 2 in extended position, the degree of such extension depending on the height of the user. The lower reduced end portion 16 is provided with a hemispherical end 15 loosely fitting in the socket member 11. Two flexible flaps 16 and 16a are provided with snap fastener elements 17 for removably attaching a backing plate 18 to the wearer's belt 12, the socket member 11 being held to plate 18 by rivets 19.

A clamping collar 20 is adjustable to a desired height above the belt 12 and socket 11 by turning the clamp screw 21 a half turn more or less by means of the bent handle portion 22 for collar 20. A flexible band 25 extends from the screw 21 over the shoulder of the operator shown by the broken line outline in FIG. 1, downward across the back and then forward under the opposite arm for attachment to screw 21 under its headed end 23. Whether or not the upstanding rod 10 is contiguous to or away from an operator's body will be governed by several factors such as the kind, size, shape of the lenticular body carried at the top of rod 10. When a camera is used the location of the shutter or actuator will be important. The adjusting screw for focussing the binoculars shown in FIG. 1 is usually adjacent the operator's thumbs. No hard and fast rule should be laid down for the degree of tension in band 25. A convenient adjustment of such tension is available in the length adjustment by means of the buckle 24 in the flexible band 25.

Above the clamping collar 20 is a second such collar 26 by means of which the length of the upper telescoping portion 13 of the upstanding rod 10 is adjustable in height to the user's convenience. The bent handle portion 27 of this clamping collar 26 is similar to that for collar 20, except for it having a locking pin 28 to preclude collar 26 coming off the upper end of rod 10.

In FIG. 3, a typical movie camera 31 is shown by the dotted outline as being mounted on a platform 30 on the telescopically extensible end 13a having a threaded upper end 32 for reception in a threaded socket in said platform lower plate 33 or in a base of the camera as is common. Where the camera does not have such a threaded socket, the lower plate 33 of the platform may provide such a threaded socket for the end 32 of rod portion 13a. The camera is carried by the upper plates 34 and 34a. The four headed bolts 46 with clamping nuts, secure the horizontal portions of the resilient arms 35, 36, 37, and 38 onto the lower plate 33, these bolts passing through longitudinal slots 44 and 45 in the lower plate. The upstanding resilient arms 35 to 38 yieldably clamp the camera and enable it to be quickly withdrawn or replaced in position on the upper plate portions 34 and 34a held in place by screws 39, 40, 41, and 42 with a spacer between the upper and lower plates of a size to enable the horizontal portions of the arms 35 to 38 to be inserted and removed when desired. The camera front is placed against the abutment 43.

The weight of whatever lenticular device is supported on rod 10 is usually sufficient to cause said rod 10 to swing away from the body in normal operating position. In this position should dampening actions of the flexible band portions be inadequate, it is only necessary to push the rod upper portion away from the body an inch or so or fraction thereof to increase tension in all portions of band 25 for the best dampening action while the hand exerts whatever pressure is needed. Because the shoulder portion of band 25 has a substantial force component in a vertical direction and the under-arm portion exerts a more effective lateral or horizontal dampening component of force, it is believed to be within the scope of my invention or my broadest claim for two separate bands to be used, although the illustrated embodiment using only one band is preferred. As used herein the term "lenticular" has reference to a device capable of being focussed. Each band end portion is adapted to dampen only half of the intended vibrations due to the fact that the band 25 is flexible and not adapted to be under compression as well as tension.

The ball and socket type support for rod 10 is preferred because the swinging of the rod 10 may be made smoothly through wide angles in any direction but is not the only kind of connection that will provide the limited swivel joint for moving the rod away from the body for strengthening the dampening action upon body vibrations. A usual belt whether of leather or other materials may be made more flexible should it appear too stiff. The term "belt" is not limited to the trouser supporting type waist band.

It may be desirable at the convenience of the user to have the buckle 24 on the band 25 located nearer a user's right hand for convenience in adjusting the band length and in removing it from clamp screw 21. So also having the end of band 25 under the headed end 23 may be at the user's convenience according to his preferance and depending on whether he is ambidextrous, right-handed, or left-handed.

The support for the lenticular device may be given additional adjustments such as are used in connection with tripods. One such includes a pivotal axis adjacent and below the platform by means of which the lenticular device may be directed steeply upwardly or downwardly when needed.

Being possessed of no oscilloscope or other means for measuring the magnitude and periodicity of at least three causes of vibration in a support for a moving picture camera, this inventor has had to determine the resultant effect empirically through found to be adequate. The three vibrations mentioned excluding the wind and weather are first and strongest is that due to the operator's breathing, a second is the inherent vibrations from a movie camera mechanism moving the shutter and film, and thirdly the operator's pulse.

The elastic band 29 holds the binoculars in place at the upper end of rod portion 13. The length of rod 10 shown in FIG. 1 between the axis of the clamping screw 21 to which the flexible band 25 is attached, and the bottom of the ball and socket 15 is between about 43 or 44 percent of the total length of rod 10. Therefore it appears apt to describe the attachement of band 25 as being adjacent a mid-portion of this supporting rod sections 10 and 13 and 14.

I claim:

1. In an apparatus for supporting a lenticular device such as a camera or a pair of field glasses, from the body without a tripod, said apparatus including an upstanding belt-supported rod long enough to bring said device to about the level of the wearer's eyes and including a flexible band portion secured to said rod and extending over a wearer's shoulder, and a second band portion secured to said rod, extending around some of the wearer's body under an arm on an opposite side of the wearer from the first mentioned band portion, the combination therewith of the improvements for dampening vertical and laterial vibrations of the wearer's body to said rod, said improvements including the second mentioned band portion being secured to said rod adjacent a mid-portion thereof and at a large enough angle to dampen lateral vibrations of the wearer's body, rod, and device, the first mentioned or over shoulder band portion also being secured adjacent a mid-portion of said rod but at a much smaller angle to said rod than is the second mentioned band portion to dampen vertical vibrations in said rod, and a ball and socket type connection for supporting said rod from a wearer's belt whereby said device may readily and smoothly follow an object moving across the wearer's field of vision.

2. A support according to claim 1 in which said rod is adjustable in length and provided with clamping means to hold it in its adjusted position of length and said band is flat with a side contiguous a wearer's clothing constructed to enhance its frictional contact with such clothing.

3. A support according to claim 1 in which said lenticular device is a field glass and a fastening means is provided which includes an elastic band extending from a rod upper portion to said device at least on two opposite sides thereof and over a portion of said device.

4. A support according to claim 1 in which a camera supporting platform is provided at an upper portion of said rod and a plurality of yieldable metal prongs position a camera on said platform.

5. An apparatus for supporting a lenticular device such as a camera or field glasses from the body of a wearer without a tripod, said apparatus including flexible band portions by which said device is supported from the body and adapted to dampen both lateral and longitudinal vibrations at least to some extent which would be otherwise transmitted to said device, an upstanding rod carrying said device adjacent the wearer's eyes, one band portion engaging said rod at an angle to reduce a compressive stress in said rod due to the weight of said device and the other band portion engaging said rod at a substantially larger, angle to dampen lateral body vibrations in said rod, and a ball and socket connection at the lower end of said rod, whereby said device may smoothly be caused to follow an object moving across the wearer's field of vision in any direction.

6. A combination according to claim 5 in which said lenticular device is a field glass.

* * * * *